United States Patent
Trimm et al.

(10) Patent No.: US 8,146,367 B2
(45) Date of Patent: Apr. 3, 2012

(54) PRODUCTION OF SYNTHESIS GAS USING CATALYST-COATED TURBINE BLADES

(75) Inventors: David Lawrence Trimm, Watsons Bay (AU); Nicholas Richard Burke, Richmond (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 854 days.

(21) Appl. No.: 11/794,037

(22) PCT Filed: Dec. 22, 2005

(86) PCT No.: PCT/AU2005/001938
§ 371 (c)(1),
(2), (4) Date: May 23, 2008

(87) PCT Pub. No.: WO2006/066335
PCT Pub. Date: Jun. 29, 2006

(65) Prior Publication Data
US 2008/0307768 A1     Dec. 18, 2008

(30) Foreign Application Priority Data

Dec. 22, 2004  (AU) ................................ 2004907298
Dec. 22, 2004  (AU) ................................ 2004907299

(51) Int. Cl.
*F02C 7/22* (2006.01)
*F02C 7/26* (2006.01)

(52) U.S. Cl. ............................................ 60/777; 60/780
(58) Field of Classification Search .................... 60/777, 60/780, 39.461–39.47
See application file for complete search history.

(56) References Cited

U.S. PATENT DOCUMENTS

| | | | |
|---|---|---|---|
| 4,811,555 A * | 3/1989 | Bell ................................ 60/777 |
| 5,355,668 A | 10/1994 | Weil et al. .......................... 60/39 |
| 5,599,517 A * | 2/1997 | Ul-Haque et al. ......... 423/418.2 |
| 5,937,632 A | 8/1999 | Döebbeling ....................... 60/39 |
| 6,189,310 B1 | 2/2001 | Kalitventzeff |
| 6,235,262 B1 | 5/2001 | Andersen |
| 2002/0083715 A1 * | 7/2002 | Dalla Betta et al. ............. 60/777 |
| 2004/0171900 A1 * | 9/2004 | Wang et al. .................. 585/658 |

FOREIGN PATENT DOCUMENTS

| | | |
|---|---|---|
| WO | WO00/00427 | 1/2000 |
| WO | WO01/77010 | 10/2001 |
| WO | WO02/085782 | 10/2002 |
| WO | 2004/020901 | 3/2004 |

* cited by examiner

*Primary Examiner* — William H Rodriguez
*Assistant Examiner* — Andrew Nguyen
(74) *Attorney, Agent, or Firm* — Jacobson Holman PLLC

(57) ABSTRACT

A process for the production of synthesis gas by oxidizing a hydrocarbon fuel comprises forming mixture of the fuel and an oxidizing gas and contacting the mixture with a catalyst coated on at least part of a turbine (18) to produce a heated gas and passing the heated gas through the turbine (18) to produce power. Also a turbine (18) having a surface comprising a catalyst for the above process.

31 Claims, 1 Drawing Sheet

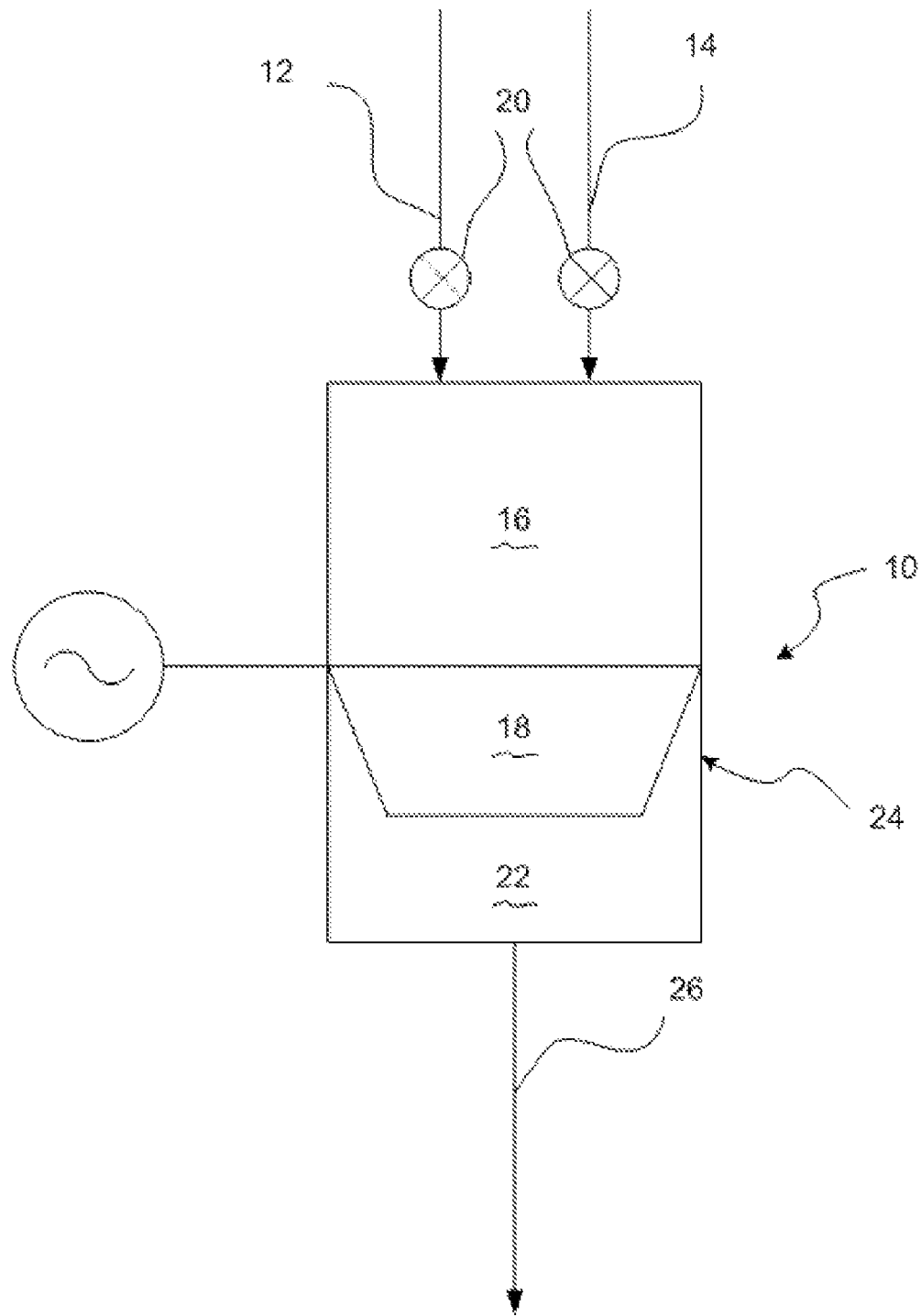

PRODUCTION OF SYNTHESIS GAS USING CATALYST-COATED TURBINE BLADES

This is a national stage of PCT/AU05/001938 filed Dec. 22, 2005 and published in English.

This application claims priority from Australian patent application Nos. 2004907299 and 2004907298, both of which were filed on 22 Dec. 2004, and the contents of which are to be taken as incorporated herein by this reference.

FIELD OF THE INVENTION

The present invention relates to the use of gas turbines in power generation, and in particular to the use of gas turbines having a coating that catalyses the conversion of hydrocarbon fuels into synthesis gas.

BACKGROUND OF THE INVENTION

Combustion chambers, in which hydrocarbon fuels such as natural gas or other gaseous hydrocarbons such as methane are burned in the presence of oxygen, are well known and have a variety of applications, including the generation of power from heat energy produced during combustion.

Combustion of hydrocarbon fuels in the presence of oxygen results in either complete combustion to give carbon dioxide ($CO_2$) and water ($H_2O$), or partial oxidation to give carbon monoxide (CO), hydrogen ($H_2$) and a range of other products depending on the conditions employed. The partial oxidation of hydrocarbon fuels to produce a mixture of carbon monoxide and hydrogen gas provides the substrates for further reactions to produce diesel fuel, ammonia, hydrogen and/or methanol, as well as other fuels and chemicals. For these purposes the mixture of carbon monoxide and hydrogen gas produced from partial combustion of hydrocarbon fuels is known as 'synthesis gas'.

The total combustion of methane is represented by the following reaction:

$$CH_4 + 2O_2 \rightarrow CO_2 + 2H_2O \quad \Delta H = -802 \text{ kJ/mol}$$

In contrast, the partial combustion of methane in the presence of oxygen to produce synthesis gas is represented by the following reaction:

$$CH_4 + \tfrac{1}{2}O_2 \rightarrow CO + 2H_2 \quad \Delta H = -35.9 \text{ kJ/mol}$$

Synthesis gas is also commonly produced by "reforming" reactions whereby hydrocarbon fuels such as natural gas, methane or other gaseous hydrocarbons are converted into synthesis gas. Two types of reforming reaction are known: steam reforming is a reaction between methane and water to form synthesis gas, whilst dry reforming is a reaction between methane and carbon dioxide to produce synthesis gas. The reforming reactions are represented by the following equations:

$$CH_4 + H_2O \rightarrow CO + 3H_2 \quad \Delta H = 207 \text{ kJ/mol (steam reforming)}$$

$$CH_4 + CO_2 \rightarrow 2CO + 2H_2 \quad \Delta H = 247 \text{ kJ/mol (dry reforming)}.$$

In recent times, catalytic conversion of methane to synthesis gas by partial combustion or reforming has been favoured over non-catalytic conversion because the former takes place at lower temperatures. In the case of partial combustion, the lower temperatures consequently produce lower emissions of nitrogen oxides that have a detrimental impact on the environment.

In catalytic systems the catalyst is typically supported on an inert support such as silica or alumina and the supported catalyst is maintained in a reaction chamber. U.S. Pat. No. 6,235,262 describes a catalytic system whereby hydrogen rich gas produced in the reaction chamber is transferred to a turbine to drive the turbine and produce rotational shaft power. The present invention aims to provide an alternative to existing synthesis gas production facilities.

A reference herein to a patent document or other matter which is given as prior art is not to be taken as an admission that that document or matter was known or that the information it contains was part of the common general knowledge in any country as at the priority date of any of the claims of this application.

Throughout the description and claims of this specification, the word "comprise" and variations of the word, such as "comprising" and "comprises", is not intended to exclude other additives, components, integers or steps.

SUMMARY OF THE INVENTION

The present invention provides a process for the production of synthesis gas by oxidising a hydrocarbon fuel, the process comprising forming a mixture of hydrocarbon fuel and an oxidising gas and contacting the mixture with a catalyst coated on at least part of a turbine to produce a heated synthesis gas mixture, and passing the heated gas through the turbine to produce power.

As used herein, the term 'synthesis gas' refers to a mixture rich in carbon monoxide (CO) and hydrogen gas ($H_2$), with other gases such as carbon dioxide and/or steam possibly present in smaller amounts.

The oxidising gas may be oxygen, water or carbon dioxide. When the oxidising gas is oxygen, the catalyst supported on the turbine will catalyse the partial oxidation of the hydrocarbon fuel to produce synthesis gas and energy. When the oxidising gas is steam, the catalyst will catalyse the conversion (or oxidation) of the hydrocarbon fuel to synthesis gas in a steam reforming reaction. Finally, when the oxidising gas is carbon dioxide, the catalyst will catalyse the conversion (or oxidation) of the hydrocarbon fuel to synthesis gas in a dry reforming reaction.

The present invention arose from a discovery that substantial processing efficiency gains could be made in a partial oxidation process if the catalyst was supported on a turbine. Firstly, rotational power can be produced by passing the reactant gases through a turbine. Secondly, there is no requirement for process unit having a reaction chamber followed by a turbine and therefore it is possible to produce smaller plant footprints. Initially, partial oxidation of hydrocarbon fuels was considered because it is an exothermic reaction and therefore the reaction itself produces energy. However, we have also discovered that reforming reactions can also be used to produce energy and synthesis gas, despite that fact that both reforming reactions are endothermic. This is because the velocity of the inlet gas is high and this, in combination with the gas expansion that takes place as a result of the reaction to produce synthesis gas, is enough to drive a turbine.

Preferably, the step of oxidising the hydrocarbon fuel is carried out in a reaction chamber containing the turbine. The oxidising gas and hydrocarbon fuel reactant gases are introduced into the chamber, where they mix or can be mixed and contact the catalyst that is supported on the turbine. It will be appreciated that the turbine will have an upstream end at which the reactant gases mix, a downstream end at which product gases are expelled, and a flow path through which the gases travel. Preferably, the catalyst is coated onto any part of the turbine that is in contact with the flow path, such as the upstream or downstream faces of one or more of the blades of the turbine. The surface area of the catalyst may be configured to control the required reaction and/or to maximise the rate of reaction. In the case of the present invention it is preferable for the area of the catalytic surface of the turbine to be maximized, or at least adjusted as to favour desired products of the catalytic reaction. For this reason, the catalyst is most preferably coated onto the blades of the turbine.

A benefit of the present invention is that there is no need to have a separate reaction chamber containing the catalyst. Additionally, the catalytic coating may protect the turbine and components from surface damage, including damage resulting from oxidation of the turbine substrate. The action of the turbine will also improve mass and heat transfer in the system.

For the partial oxidation reaction, the coating preferably contains a nickel or rhodium based catalyst. Suitable rhodium based catalysts include $Rh/\gamma-Al_2O_3$, whilst suitable nickel based catalysts include $NiO/Al_2O_3$, $Ni/\gamma-Al_2O_3$, $Ni/ZrO/Al_2O_3$, $Ni/La_2O_3/Al_2O_3$, $Ni/ZrO$, $NiO/ZrO_2$ and others.

Catalysts useful for steam and dry reforming reactions are well known in the art. They are typically catalytic metal, such as Group VIII noble metals. Thus, the coating preferably contains a rhodium, iridium, nickel, palladium, platinum, ruthenium, or carbide of group VIb catalyst. Preferred catalysts for this purpose include nickel on magnesium oxide, nickel on α-alumina, spinel doped with $K_2O$, Rh/alumina, and Rh/MgO.

Preferably, for partial oxidation reactions the coating contains up to 10% (w/w) catalyst, more preferably up to 5%, and most preferably about 0.3%. Reforming reactions usually require between 5 and 60% active catalyst component, depending on the catalyst material used.

Optionally, the catalytic coating may be applied on top of a thermal barrier coating.

In the context of the present invention, components of the turbine provide a structure, substrate or support that provides mechanical and structural integrity. The coating or coating system provides one or more layers of other materials applied sequentially to the surface of the substrate to confer some particular attribute thereto, For example, one type of coating system contemplated in the present invention includes a layer of a metallic bond coat which serves to secure a subsequently applied ceramic layer to the substrate and protect the substrate against oxidation, a layer of ceramic thermal barrier coating, which reduces the flow of heat from hot gases to the substrate, and a layer of catalytic material, which promotes the oxidation process.

By providing catalytic surfaces on components of turbines, the present invention provides for little or no modification to the configuration of the flow path surface, and, therefore, little or no change to gas flow through the turbine, As such turbines with catalytic surfaces can be used to replace prior art components without catalytic surfaces. In this way, existing turbine containing systems can be retrofitted with turbines containing catalytic surfaces.

Optionally, the system may have a second catalyst supported upstream of the turbine so that catalytic oxidation occurs upstream of the turbine, and the catalytic surface on the turbine ensures completion of the reaction.

The present invention also provides a turbine in which at least part of the surface of the turbine contains a catalyst for catalysing oxidation of a hydrocarbon fuel in the presence of an oxidising gas. Preferably, the turbine is suitable for use in a reactor as described herein.

BRIEF DESCRIPTION OF THE FIGURES

The present invention will now be described in relation to an embodiment illustrated in the accompanying Figures.

However, it must be appreciated that the following description is not to limit the generality of the above description.

In the Figures:

FIG. 1 shows a schematic view of a reaction chamber containing a coated turbine of the present invention.

DETAILED DESCRIPTION OF THE INVENTION

The invention will now be discussed in more detail with reference to processes including the step of converting natural gas to produce carbon monoxide and hydrogen gas (so called 'synthesis gas'). The step of converting natural gas to synthesis gas also produces heat energy in the case of a partial oxidation reaction. The heat energy is subsequently converted into power (e.g. electrical power) by the turbine. The step of converting natural gas to synthesis gas could also be a reforming reaction. It will be appreciated that the embodiments described are preferred embodiments, and that the invention is not restricted to the particular embodiments described. For example, the present invention also contemplates other oxidation or combustion processes including complete combustion of natural gas or other suitable hydrocarbon fuels to produce carbon dioxide.

Partial Oxidation using Molecular Oxygen

The oxidation process now referred to involves the catalytic partial oxidation of natural gas to produce heat and synthesis gas. Some carbon dioxide and water may also be produced. With the catalyst supported on the turbine, oxidation takes place near the turbine and therefore heated gases are produced at this point.

In the context of the present invention, the term 'synthesis gas' refers to a mixture of carbon monoxide (CO) and hydrogen gas ($H_2$). Other gases such as carbon dioxide and/or steam may also be present with the synthesis gas. In addition, the term 'hydrocarbon fuel' is used herein to refer to the carbon source that is partially oxidised. Natural gas, methane and other heavier feedstocks such as higher gaseous and liquid hydrocarbons and oxygenated hydrocarbons can be partially oxidised to form synthesis gas and therefore the term hydrocarbon fuel is to be taken to include any of the aforementioned alternatives, again not excluding the presence of carbon dioxide and steam.

The partial oxidation of natural gas may be carried out using any suitable reaction conditions under which the reaction produces heat energy, i.e. is exothermic. For example, partial oxidation of natural gas with molecular oxygen in the presence of a catalyst is an exothermic reaction and is particularly suitable for use in the process of the present invention.

Preferably, natural gas and oxygen are supplied to the reactor in a $C:O_2$ ratio of from 1.6 to 2.5 and preferably from 1.8 to 2.2, taking into account the explosive limits of the partial oxidation gaseous mixture. If necessary, an inert gas (e.g. nitrogen gas) may be used in the natural gas/oxygen feedstock to keep the mixture rich of explosive limits.

The natural gas/oxygen mixture is then contacted with catalytic surfaces on the turbine to catalyse the oxidation reaction. Accordingly, a partial oxidation reaction zone is formed in the vicinity of the turbine and synthesis gas emanating downstream of the turbine may then be supplied to a further reaction zone, a processing zone and/or a storage zone.

The natural gas/oxygen gas feedstream is pressurised to a pressure in the range of about 1 to 50 atmospheres, and is preferably carried out at 5 to 50 atmospheres using a suitable compressor. Using electricity generated from the turbine to drive the compressor will reduce the capital and operating costs of the process.

The relative portion of natural gas and oxygen in the feedstream can be regulated to convert a substantial portion of the carbon in the stream to carbon monoxide. Due to the exothermic nature of the partial oxidation reaction, preheating of the reactant gases is generally not necessary, and in many cases preheating of the reaction gases may decrease both the energy output of the turbine and the yield of the synthesis gas.

Natural gas conversion in the partial oxidation reaction is dependent on pressure, flow rate, carbon:oxygen ($C:O_2$) ratio of the reactant gases, and the type of catalyst used. Selectivity to synthesis gas is also dependent on the system pressure, flow rate, $C:O_2$ ratio of the reactant gases, and the catalyst used.

In one preferred form of the invention one mole equivalent of hydrocarbon fuel is reacted with one half mole equivalent of oxygen to produce carbon monoxide and hydrogen gas in a 1:2 molar ratio suitable for Fischer-Tropsch or methanol synthesis.

Preferably, the catalyst is selected from one or more of: Ni based catalysts including Ni and NiO; platinum based catalysts including Pt metal; rhodium based catalysts including Rh metal; ruthenium based catalysts including Ru metal, pyrochlore ($Ru_2O_7$) based catalysts; iridium based catalysts including Ir metal; and palladium based catalysts including Pd metal. Preferred catalysts include $Rh/\gamma-Al_2O_3$, $NiO/Al_2O_3$, $Ni/\gamma-Al_2O_3$, $Ni/ZrO/Al_2O_3$, $Ni/La_2O_3/Al_2O_3$, $Ni/ZrO$, $Ni/MgO$, and $NiO/ZrO_2$. Most preferably, the catalyst is a rhodium/$\gamma-Al_2O_3$ catalyst supported on $\alpha-Al_2O_3$ or $ZrO/Al_2O_3$ sponge monolith support, or a Ni based catalyst supported on one or more of magnesia, zirconia or alumina.

Energy in the form of heat is supplied to the area containing the coated turbine and once sufficient energy has been supplied to overcome activation energy of the reaction (the temperature required for "lightoff" of the reaction is dependent on the efficiency of the heating source, the type of reactor, the catalyst configuration and the volumetric flow rate through the reactor. The furnace temperature is usually set between 600 and 800 degrees C.) production of syngas occurs autothermally.

The hot, pressurized gas passes through the turbine and its energy is converted to kinetic energy by the turbine. Gas of a lower pressure and temperature leaves the turbine but the chemical composition of the gas entering and leaving the turbine (essentially synthesis gas with some unreacted fuel gas, possibly small amounts of carbon dioxide and water and inerts) is unchanged. The synthesis gas can then be used for further processing as required.

The turbine may be air cooled in cases where elevated temperatures may lead to damage of the turbine equipment, such as the catalytic coating. However, the operating temperature of the system should not exceed 1000° C. under normal operating conditions.

The power derived from rotating the turbine shaft can be used to operate a mechanical device such as a pump or compressor, and/or an electrical device such as a generator. Thus, using the process of the present invention, heat energy can be converted into electrical power. Electricity generated by the turbine may be used to drive downstream reactions, such as the Fischer-Tropsch reaction and the condensation and recycling processes used in these reactions. The energy generated may also be used for services required at the production facility or, in the case of a large scale facility, may be pumped back into an electricity grid.

The amount of power generated is dependent on the system pressure and the temperature rise as a result of the exothermic partial oxidation reaction. The temperature rise is dependent on fuel conversion and product yield. The theoretical maximum power output is 3 MW for a feed of 100 tonnes per day methane.

Reforming Reactions

Instead of molecular oxygen, steam or carbon dioxide can be used as the oxidising gas. In either case, the methane in natural gas (or other hydrocarbon fuel) is partially oxidised to form carbon monoxide and hydrogen gas (i.e. synthesis gas). Steam and dry reforming reactions are endothermic and therefore the reactant gas stream and catalyst must be heated.

Thus, a gas stream of natural gas and either steam or carbon dioxide is introduced to the reaction chamber at the upstream side of the turbine. The oxidising gas may come from a variety of sources and will be somewhat dependent upon the nature of the reaction being used. For example, steam reforming requires only steam. The hydrocarbon fuel and steam are mixed in a $H_2O$:hydrocarbon ratio of 0.4 or more for the steam reforming reaction, and a $CO_2$:hydrocarbon ratio of 0.5 or more for the dry reforming reaction. The person skilled in the art will appreciate that the actual $H_2O$:hydrocarbon or $CO_2$:hydrocarbon ratio that is used will depend on a number of factors, including the catalyst used, the desired composition of the synthesis gas, and the need to minimise coke formation in the reactor. Steam:hydrocarbon ratios of 2.0-2.4 are used in steam reforming reactors, with the ratio dropping to 0.4-0.6 when the reaction is autothermal.

The hydrocarbon fuel and oxidising gas feeds are generally preheated, mixed and passed over or through the catalyst supported on the turbine. As the mixture contacts the catalyst the synthesis reactions take place.

The catalyst is supported on the turbine as described previously. The catalyst compositions useful for synthesis gas reactions are well known in the art. The most common catalytic metals are Group VIII noble metals.

The synthesis gas product contains primarily hydrogen and carbon monoxide, however, other minor components may be present including steam, nitrogen, carbon dioxide, ammonia, hydrogen cyanide, etc., as well as unreacted gases, such as methane and/or oxygen. The synthesis gas product, is then ready to be used, treated, or directed to its intended purpose. For example, some or all of the synthesis gas may be used as a feedstock for a Fischer-Tropsch process or other processes such as an alcohol synthesis plant.

The reforming reactions are preferably carried out at a temperature of between about 350 degrees C. and about 900 degrees C. and at pressures less than about 20 bar. The catalyst support is chosen to minimise coke formation (e.g. magnesia, potassium doped spinel are the Haldor Topsoe and Johnson Matthey supports).

Reaction Chamber

FIG. 1 shows a schematic view of a reaction chamber 10 suitable for use with the process of the present invention. The reaction chamber 1 0 is surrounded by insulation to minimise heat losses. The reactor may be a steel wall pressure vessel, or any other suitable reactor.

The reaction chamber 10 has an inlet 12 for the hydrocarbon fuel, and an inlet 14 for the oxidising gas. The gases are introduced into the chamber at an upstream end 16 of the turbine 18. The ratio of gases in the upstream end of the chamber are controlled using mass flow controllers 20 to control the flow rate of gas entering the reaction chamber.

The chamber has a downstream end 22 at which product gases are expelled and a flow path 24 between the upstream end 16 and the downstream end 22. The flow path 24 includes the turbine having the catalyst coating located on at least a portion of the turbine.

The reactant gases are heated before they pass over the turbine 18. As the gases pass over the turbine, the catalyst surface initiates and propagates the partial oxidation or reforming reaction, giving rise to a product synthesis gas mixture comprising predominately carbon monoxide and hydrogen. The product gas mixture maybe removed from the reaction chamber via a take off line 26. The product gas mixture may then be stored or used directly as feedstock for other processes as described.

The turbine 18 is configured so that gases passing through the flow path of the turbine cause it to rotate. The power generated by rotation of the shaft of the turbine may be converted to mechanical energy or electrical energy.

DESCRIPTION OF EMBODIMENTS OF THE INVENTION

The invention will now be described with reference to the following examples. It is to be understood that the examples are provided by way of illustration of the invention and that they are in no way limiting to the scope of the invention.

EXAMPLE 1

A method for preparing turbine blades with bond, thermal and high activity alumina coatings is outlined below. Further details for carrying out the method are presented in "Nickel alumide coatings", Report commissioned by CSIRO and authored by David J Young (December 2003) on behalf of Unisearch Limited.

The method described below is for coating of small samples of IN-738 and MAR M-246 super alloy. The method can also be applied to larger items such as whole turbine blades and ceramics.

Method:
  Samples were polished prior to cleaning.
  All samples were ultrasonically cleaned in acetone for 3 min and weighed. A pre-coating of yttria slurry was applied before packing.
  Pack powder containing a fine powder of aluminium as the source material was premixed for 0.5 h using a SPEX 8000 Mill/Mixer before being loaded into a cylindrical alumina crucible with dimensions of approx 30 mm internal diameter and 50 mm length. The experimental apparatus and specimen arrangement inside the crucible are shown in FIG. 1. The packed crucible was topped off with pack powder and covered with an alumina lid. Alumina-based cement was used to seal the lid. The sealing cement was then dried.
  The pack aluminising process was carried out in a horizontal tube furnace. For a given aluminising process, the packed crucible was placed into the uniform hot zone of the furnace at room temperature. High purity argon at a flow rate of 100 mL/min was introduced into the furnace 20 min after the furnace was sealed. Argon was then left flowing for the rest of the process. To remove the residual moisture in the cement, the furnace was heated up to 200° C. and held at this temperature for 2 hours. The furnace was then heated up to the desired deposition temperature (900° C.) at the rate of 300° C./h in order to form the nickel aluminide ($Ni_2Al_3$) phase. Upon completion of deposition the pack was allowed to cool in the furnace. Coated specimens were then removed from the pack and cleaned prior to the annealing process.
  Annealing of coated samples was carried out in a horizontal tube furnace. Samples were loaded into an alumina boat which was initially left in the cold zone of the furnace. Under an atmosphere of 5% $H_2$/Ar gas the moved into the hot zone of the furnace and annealed at 1050° C. for 24 hours. At the completion of the process the samples were again moved into the cold zone of the furnace and allowed to cool.
  Once the bond coating and thermal and chemical protective coatings for the blade material were in place the catalyst support material (in this case γ-alumina) was applied. Note that several other support materials may be used. The coating method used for the catalyst support material is an adaptation of that used by Arafiotis and Tsetsekou (Agrafiotis, C. and Tsetsekou, A. The Effect of Powder Characteristics on Washcoat Quality. Part I: Alumina Washcoats. Journal of the European Ceramic Society. 2000; 20(7):815-824) and is outlined below:
  Ring mill powder to be coated for 10 min
  Stir mill the resulting powder at 1500 RPM for 10 min using 1 mm ceramic balls and DI water in the stir mill.
  Filter stir milled material to remove water.
  Make up a 35% aqueous slurry of each of the powders and use 1:1 HCl to adjust to pH<4
  Stir vigorously for 24 hours in a sealed container
  Dip coat the high density alumina substrates by vertically dipping into the slurry for 15 s then slowly withdrawing the "coated" substrate material
  Pretreat materials to be coated at 900° C. in a calcining oven for 2.5 hours
  Dry coated samples for 1.5 hours at 110° C.
  Calcine dried samples at 600° C. for 2 hours.
  The following procedure was used to coat catalytic material onto the previously coated superalloys IN-738 and MAR M-246:
  Make up rhodium solution using 1 ml of 10% $Rh(NO_3)_3$ and 6 ml of Distilled water.
  Soak the calcined substrates in the Rh solution, until the solution is mostly absorbed.
  Calcine the Rh-impregnated substrates at 600° C. for 6 hours.
  Once the blades of the turbine have been coated the gas mixture described above is introduced, energy in the form of heat is supplied to the area containing the coated turbine and once sufficient energy has been supplied to overcome activation energy of the reaction (the temperature required for "lightoff" of the reaction is dependent on the efficiency of the heating source, the type of reactor, the catalyst configuration and the volumetric flow rate through the reactor but is usually between 600 and 800 degrees C.) production of syngas occurs autothermally.

EXAMPLE 2

A mixture of methane (or natural gas) and oxygen, with or without carbon dioxide, water or inert gases such as nitrogen or argon, at a given temperature (0-100 degrees C.), pressure (atmospheric to 50 atm) and volumetric flow rate at contact times of 1-0.005 sis passed over a catalyst which is designed to produce syngas ($H_2$+CO) by the catalytic partial oxidation of methane (natural gas). The catalyst is located on the blades of a turbine as disclosed in Example 1 and on reaction the gas products expand and drive the turbine. The turbine is driven by the pressure, temperature and volumetric flow rate of the gaseous products.

The technique is applicable to any gas processing system in which high pressure and/or temperature gases are available and further processing of the gaseous product (in this case syngas) of the initial reaction is not required. The use of the energy stored in the gas can reduce operating expenditure through the life of a chemical facility. The rotation of the turbine blades ensures more homogeneity and better mass and heat transfer. The design of the catalyst on the blades of the turbine allows for smaller plant footprints and lower infrastructure costs. The method described is applicable to any process in which an exothermic reaction produces a gas which can be used to drive a turbine or other device for deriving energy from the product gas stream without further conversion of this product gas.

EXAMPLE 3

A mixture of methane (natural gas) and carbon dioxide or water is pressurised to between 2 and 20 bar and passed over a preheated (600-900° C.) catalyst consisting of 5% Rh on alumina coated onto turbine blades as described above. The reforming reaction (either steam or dry or a combination of the two) produces syngas (CO and $H_2$) and the high gas flow rate and gas expansion on reaction drives the turbine.

Finally, it is understood that various other modifications and/or alterations may be made without departing from the spirit of the present invention as outlined herein.

The invention claimed is:

1. A process for the production of synthesis gas from a turbine for the production of power by the turbine, the turbine comprising blades having upstream and downstream faces, there being catalyst coated on the upstream or downstream faces of one or more of the blades, the process comprising forming a mixture of a hydrocarbon fuel and an oxidising gas, passing the mixture through the turbine and over the catalyst coated blades to oxidize the hydrocarbon fuel and drive the turbine to produce power, the oxidizing of the hydrocarbon fuel being conducted under conditions to produce synthesis gas.

2. The process according to claim 1 wherein the oxidising gas is oxygen.

3. The process according to claim 1 wherein the oxidising gas is steam or carbon dioxide.

4. The process according to claim 1 wherein the step of oxidising the hydrocarbon fuel is carried out in a reaction chamber containing the turbine.

5. The process according to claim 4 wherein the oxidising gas and hydrocarbon fuel reactant gases are introduced into the chamber to form the mixture.

6. The process according to claim 5 wherein the chamber comprises an upstream end for mixing of the reactant gases and a downstream end at which product gases are expelled and a flow path therebetween, the flow path including catalyst coated turbine blades contacting the gas flow.

7. The process according to claim 1 wherein the synthesis gas is produced by oxidizing the hydrocarbon fuel under an endothermic reforming reaction.

8. The process according to claim 1 wherein the catalyst is selected from the group consisting of: Ni based catalysts; platinum based catalysts; rhodium based catalysts; ruthenium based catalysts; pyrochlore ($Ru_2O_7$) based catalysts; iridium based catalysts; and palladium based catalysts.

9. The process according to claim 8 wherein the catalyst contains at least one of nickel and rhodium based catalysts.

10. The process according to claim 9 wherein the catalyst comprises at least one catalyst selected from the group consisting of: $Rh/\gamma-Al_2O_3$, $NiO/Al_2O_3$, $Ni/\gamma.-Al_2O_3$, $Ni/ZrO/Al_2O_3$, $Ni/La_2O_3/Al_2O_3$, $Ni/ZrO$, $Ni/MgO$, and $NiO/ZrO_2$.

11. The process according to claim 1 wherein the catalyst is a $Rh/\gamma-Al_2O_3$ catalyst supported on $\alpha-Al_2O_3$ or $ZrO/Al_2O_3$ monolith support, or a Ni based catalyst supported on one or more of magnesia, zirconia or alumina supports.

12. The process according to claim 3 wherein the coating contains up to 60% (w/w) catalyst.

13. The process according to claim 2 wherein the coating contains up to 5% (w/w) catalyst.

14. The process according to claim 13 wherein the coating contains about 0.3% (w/w) catalyst.

15. The process according to claim 1 wherein the catalytic coating is applied to at least part of the one or more turbine blades on top of a thermal barrier coating.

16. The process according to claim 15 wherein the turbine blade coating comprises multiple coating layers comprising a layer of a metallic bond coat which serves to secure a subsequently applied ceramic layer to the blade and protect the blade against oxidation, a layer of ceramic thermal barrier coating, which reduces the flow of heat from hot gases to the blade, and a layer of the catalytic coating.

17. The process according to claim 6 further including contacting the mixture with a catalyst supported upstream of the turbine so that partial oxidation occurs upstream of the turbine, and the catalyst coated turbine blades provide further catalysis of the oxidation.

18. The process according to claim 1 wherein the hydrocarbon fuel is natural gas.

19. The process according to claim 18 wherein the oxidizing gas is oxygen and the natural gas and oxygen are mixed in a $C:O_2$ ratio of from 1.6 to 2.5 before being contacted with the catalyst coated turbine blades.

20. The process according to claim 19 wherein the natural gas and oxygen are mixed in a $C:O_2$ ratio of from 1.8 to 2.2 before being contacted with the catalyst coated turbine blades.

21. The process according to claim 18 wherein the oxidizing gas is steam and the hydrocarbon fuel and steam are mixed in a $H_2O$:hydrocarbon ratio of 0.4 or more before being contacted with the catalyst coated turbine blades.

22. The process according to claim 18 wherein the oxidizing gas is carbon dioxide and the hydrocarbon fuel and carbon dioxide are mixed in a $CO_2$:hydrocarbon ratio of 0.5 or more before being contacted with the catalyst coated turbine blades.

23. The process according to claim 1 wherein the oxidising gas is compressed to 5 to 50 atmospheres using a compressor.

24. A turbine for generating power, the turbine comprising blades having upstream and downstream faces, there being catalyst coated on the upstream or downstream faces of one or more of the blades, the turbine in fluid communication with a source of a mixture of a hydrocarbon fuel and an oxidizing gas such that the mixture passes over the catalyst coated blades to oxidize the hydrocarbon fuel and drive the turbine to generate the power; the oxidizing of the hydrocarbon fuel being conducted under conditions to produce synthesis gas; and wherein no combustion occurs upstream of the inlet of the turbine.

25. The turbine according to claim 24 wherein the catalyst is selected from the group consisting of: Ni based catalysts; platinum based catalysts; rhodium based catalysts; ruthenium based catalysts; pyrochlore ($Ru_2O_7$) based catalysts; iridium based catalysts; and palladium based catalysts.

26. The turbine according to claim 25 wherein the catalyst contains at least one of nickel and rhodium based catalysts.

27. The turbine according to claim 26 wherein the catalyst comprises at least one catalyst selected from the group consisting of: $Rh/\gamma-Al_2O_3$, $NiO/Al_2O_3$, $Ni/\gamma.-Al_2O_3$, $Ni/ZrO/Al_2O_3$, $Ni/La_2O_3/Al_2O_3$, $Ni/ZrO$, $Ni/MgO$, and $NiO/ZrO_2$.

28. The turbine according to claim 26 wherein the catalyst is a $Rh/\gamma-Al_2O_3$ catalyst supported on $\alpha-Al_2O_3$ or $ZrO/Al_2O_3$ monolith support, or a Ni based catalyst supported on one or more of magnesia, zirconia or alumina supports.

29. The turbine according to claim 25 wherein the coating contains up to 60% (w/w) catalyst.

30. The turbine according to claim 25 wherein the catalytic coating is on top of a thermal barrier coating.

31. The turbine according to claim 30 coated with multiple coating layers comprising a layer of a metallic bond coat which serves to secure a subsequently applied ceramic layer to the one or more turbine blades and protect the blades against oxidation, a layer of ceramic thermal barrier coating, which reduces the flow of heat from hot gases to the blades, and a layer of the catalytic coating.

* * * * *